Dec. 4, 1928.
B. GOODMAN
DRAFT REGULATOR
Filed Dec. 7, 1927
1,693,814
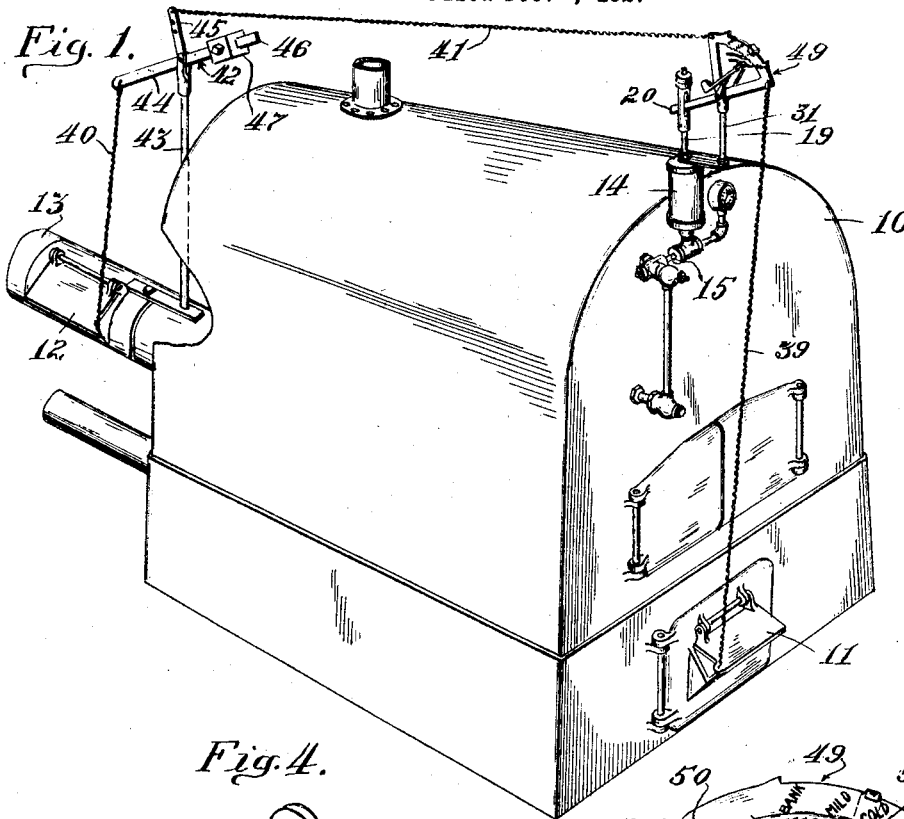
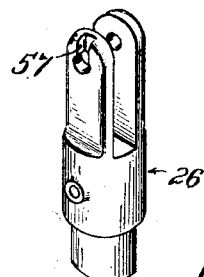
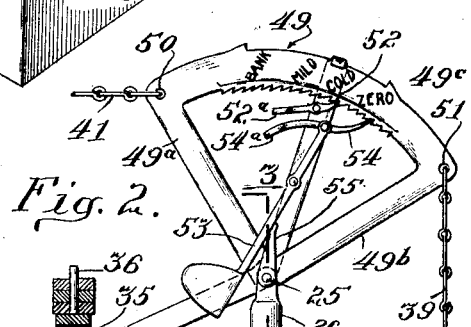
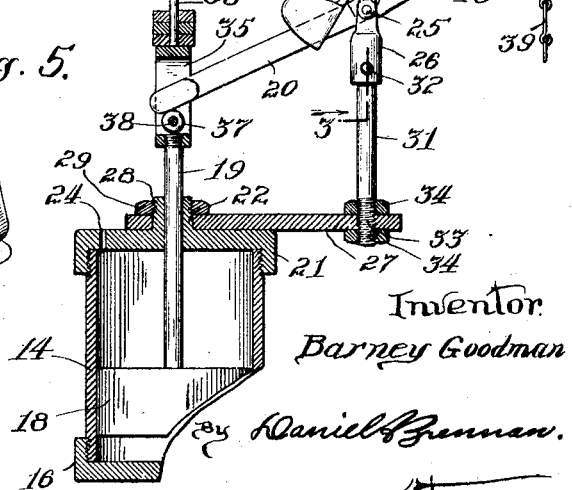
Inventor
Barney Goodman
By Daniel Brennan.
Attorney.

Patented Dec. 4, 1928.

1,693,814

UNITED STATES PATENT OFFICE.

BARNEY GOODMAN, OF CHICAGO, ILLINOIS.

DRAFT REGULATOR.

Application filed December 7, 1927. Serial No. 238,353.

This invention relates to draft regulators, and more particularly to automatic regulators adapted for use on heating boilers.

It contemplates more especially the provision of simple means which will afford automatic draft regulation over a wide operating range thereby effecting a marked economy in fuel saving without necessitating the use of a thermostat or other complex or expensive expedients.

The regulators of known construction are expensive, complex in structure and not always effective over a wide operating range. Boilers and other heat generating systems are operated at extreme loads which necessarily subjects them to high and low pressures, thereby necessitating the use of regulators which are adapted to function under these extreme conditions without impairing their sensitivity and reliability.

Further, since it is the usual practice for generating systems to produce loads of varying capacity, it is desirable that their regulators be readily adjustable to effect economic regulation at the desired pressure or pressures.

It is common practice to, after a new supply of coal has been fed to the fire, open the draft closure to cause a quick burning of the fuel, and as soon as the fuel has a good start to close it again, while in the present invention the device is designed so that it can be set to gradually and automatically reduce the draft opening during this period, to effect an economy in operation.

An object of the present invention is to improve the construction and operation of devices of the character mentioned.

An object of the invention is to provide an inexpensive device which is effective to render automatic regulation over a wide operating range.

An object of the invention is to provide simple means for varying the range of operation of a regulator with ease and accuracy.

An object of the invention is to provide a regulator which is sensitive to heat changes, thereby insuring economic fuel consumption and efficient operation at any predetermined load.

An object of the invention is the provision of an automatic regulator which does not necessitate the use of a thermostat or other complicated or expensive expedients.

An object of the invention is to provide a regulator that can be set at the time a supply of coal is fed to the furnace so as to give full draft, and arranged so that it will gradually and automatically reduce that draft until it is time for a new supply of coal to be fed to the furnace, at which time it may readily be reset to perform the same operation.

An object of the invention is to provide means for cutting out or making ineffective the mechanism provided for gradually reducing the draft, and thereby converting it so as to automatically regulate the draft, either by increasing or decreasing it automatically with the fluctuation of boiler pressure which feature is especially useful in severe weather when sufficient heat is more important than a strict economy in fuel consumption.

With the foregoing and such other objects in view as will appear as the description proceeds, the invention resides in the combination and arrangement of parts and in the details of construction hereinafter described and claimed, it being understood that changes in the precise embodiment herein described, may be made within the scope of what is claimed without departing from the scope or spirit of the invention.

In the drawings:

Figure 1 is a perspective view of a steam boiler having the regulator of the present invention mounted thereon.

Figure 2 is a fragmentary sectional view showing a regulator embodying features of the present invention.

Figure 3 is a sectional view taken on line 3—3 of Figure 2.

Figure 4 is a detail view of a slotted connection.

Figure 5 is a perspective view of a trip or cam lever.

A regulator illustrative of the present invention is shown applied to an ordinary steam boiler 10 having the usual hinged, gravity operated fire box draft door 11, which controls the admission of air to the fire box, and the usual hinged damper closure 12 which controls the intake of air to the flue 13 through which the smoke and waste flue gases escape to the atmosphere.

Steam pressure in the boiler 10 communicates with a steam or pressure cylinder 14 which in this instance, is vertically disposed and mounted so that its lower or steam end is subjected to the pressure in the valved steam line 15. As shown, the cup shaped cylinder head 16 is in threaded engagement with the cylinder 14 in the usual conventional manner. A piston 18 is mounted for reciprocation in the cylinder 14 so that the centrally disposed piston rod 19 secured thereto will impart movement to a transmitting lever 20, which contacts with a roller having a slotted connection when the former moves upwardly as a result of a pressure change. In order to insure proper piston reciprocation without jamming or causing unusual wear of the coacting parts, a cylinder head 21 having a central upstanding bearing boss 22 is provided with a bore to slidingly receive the piston rod 19 to form a long guide therefor. This is highly desirable, for the piston is then incapable of readily tilting, thereby insuring smooth piston reciprocation within the cylinder 14 at all times. To enable the air confined in the cylinder above the piston rod 19 to escape before becoming compressed upon upward movement of the piston, the cylinder head 21 is provided with one or more perforations 24 which freely permits ingress and egress of the air to and from the variable space above the piston thereby subjecting it to atmospheric pressure.

A bell crank transmitting lever 20 is pivoted about the pivot pin 25 which is mounted in a fork 26. The fork is rigidly secured in fixed relation to the cylinder 14 by virtue of a horizontally disposed plate 27 which is provided with a hole at one end thereof to fit over the boss 22. This boss is threaded at 28 to receive a lock nut 29 which firmly holds the plate 27 against the cylinder head 21. A standard 31 which is secured to the fork 26 in any appropriate manner, as for instance, by the cap screw 32 renders the lever 20 vertically adjustable, in that the lower portion of the standard 31 is threaded as at 33 to receive a pair of spaced nuts 34 between which the plate 27 is firmly fixed by virtue of the opening provided therein. Obviously by manipulating the nuts 34 the extension standard rod 31 may be raised or lowered within the limits of the threaded portion 33.

The piston rod 19, as shown, is adapted to coact with the lever 20 to impart or transmit movement thereto about the pivot pin 25. In order to reduce the friction to a minimum between the coacting parts of the lever 20 and the piston rod 19, the upper extremity of said rod 19 is provided with a slotted connection 35 which is adapted to receive the lever 20, and is provided with a rod 36 to hold weights that may be used to regulate the operating pressure of the piston. An antifriction roller 37 is rotatively mounted within the slotted connection 35 on a transverse pivot pin 38 so that when the roller 37 contacts with the lever arm 20 to impart movement thereto, the roller 37 will rotate, thereby eliminating friction resulting from a sliding contact. It is to be noted that the lever 20 will be caused to rotate about its pivot 25 in a clockwise direction upon upward movement of the piston rod 19; however, the weight of the regulator will not in itself effect a downward movement of the lever 20 thereby necessitating means to normally keep the lever arm in its lowest position. This is accomplished in the present embodiment by gravity operated means to be hereinafter described.

It is one purpose of this invention to regulate the alternate admission of air to either the fire box or the chimney flue by varying the areas of their respective openings either simultaneously or one in advance of the other. Therefore, it is possible to directly connect the draft door which controls admission to the fire box, and the flue closure in such a way as to effect either their simultaneous or one in advance of the other opening and closing, or vice-versa as may be necessary to regulate the pressure of the system within predetermined limits. The means employed in the present instance to effect such movement of the flue and fire box draft doors, comprises flexible tension elements, in this instance a chain 39 connects the fire box draft door 11 and the parts associated with the lever 20. Likewise the flue damper door 12 is connected to the lever by similar means such as the chains 40 and 41 which are interconnected by virtue of an inverted T-shaped lever 42, which is pivoted to a fixed vertical standard 43 preferably at the jointure of its arms 44, 45 and 46. As shown, the standard 43 is preferably situated near and fixed to the frame of the damper door 12 so that the chain 40 may be conveniently connected to an arm 44 of the T lever in the usual manner, and the horizontally extending chain 41 connected to the arm 45. It is noteworthy here that any oscillation imparted to the transmitting lever 20 by virtue of a pressure increase within the cylinder 14 will cause the transmitting lever 20 to move in a clockwise direction, thereby moving the fire box door 11 to position to reduce the area of its inlet opening and moving the chimney flue damper door 12 to position to increase its outlet opening area. A counter-weight 47 is adjustably secured to the remaining arm 46 of the lever 42 to offset or balance a part of the weight of the damper door 12 which in this instance is such as to effect a constant pull on the transmitting lever 20 sufficient to cause said lever to contact at all times within its operating range with the roller 37 until the flue damper 12 is entirely closed. With a downward movement of the piston 18 due to a diminishing pressure, the damper door 12 will drop, thereby causing the lever 20 to move counter-clockwise until the pressure change is compensated for.

With the arrangement of parts thus far described, it is evident that an increase in pressure will, in proportion to said pressure, open the damper door 12 and close the draft door 11 thereby keeping the boiler in operation under substantially the predetermined desired pressure. To enable the closures 11 and 12 to open and close at any desired pressures so as to afford automatic regulation over a wide operating range, a ratchet mechanism is provided to effect the operation of the regulator over variable predetermined limits thereby making necessary only a convenient adjustment, in order that the heat generating system will be automatically regulated to any desired load or pressures. By so doing the closures 11 and 12 may be made to open and close at any desired boiler pressure by merely adjusting a simple calibrated ratchet mechanism which will permit the device to respond to critical predetermined pressures.

The means for controlling the critical pressure at which the air intakes are to open and close to effect regulation, in this instance, comprises a ratchet toothed regulator in the form of a quadrant operatively associated with a plurality of pawls which may be set to limit the effective oscillating range of the transmitting lever 20. By adjusting the regulating quadrant to its extreme counter-clockwise position and the pawls to their extreme clockwise position, the piston rod in its movement upward will impart movement to the transmitting lever 20 which in turn will actuate the quadrant 49 as the later is connected to the transmitting lever by means of the pawls. The specific means employed in this instance comprise a regulating quadrant lever 49 having angularly related arms 49$^a$ and 49$^b$ connected by a curved arm 49$^c$ pivoted about the pivot pin 25 at the juncture of the two arms 49$^a$ and 49$^b$, thereby permitting the quadrant lever 49 and the transmitting lever 20 to move or oscillate about a common center. As shown, the free extremities of the arms 49$^a$ and 49$^b$ of the quadrant 49 are provided with holes 50 and 51 which are designed to receive the chains 39 and 41. It will be noted that any movement of the closure 11 will impart a corresponding movement to the closure 12 by virtue of the direct connection therebetween established by the chains 39, 40 and 41 which are connected as above described.

In order to retain the transmitting lever 20 and the regulator 49 in fixed relation so that both will move in unison in one direction, a disengageable ratchet connection is provided between the lever 20 and the regulator. This connection comprises a pawl 52 pivotally mounted on one of the arms of the lever 20 arranged to engage a ratchet rack on the curved arm 49$^c$ of the regulator 49. As shown, this rack is arranged on the internal peripheral edge of the arch member 49$^c$ of the regulator, and corresponds in length with the adjustable pressure range, ranging from the maximum to the minimum that may be required of the boiler at any time. A balance lever 53 is pivotally secured to the arm of lever 20 below the pawl 52 and pivotally carries another pawl 54 arranged to engage the ratchet rack.

A trip 55 is provided for use when the device is to be utilized to gradually reduce the draft, and is pivotally secured to the fork 26 and is arranged to engage the lower end of the balance lever 53 to operate through it and pawl 54, as the transmitting lever 20 is rotated. A rib 56 is provided on the inner side of the trip arranged to engage a slot 57 in the outer side of one of the prongs of the fork 26, to hold said trip against rotation. The pivot 25 on which the trip is mounted, has a coil spring 58 between its head and the trip 55 thereby holding said rib 56 in demountable engagement with said slot and in yielding engagement with said pivot 25.

To normally maintain the pawls 52 and 54 in engagement with the ratchet teeth along the regulator, gravity lever arms 52$^a$ and 54$^a$ are provided and extend therefrom respectively.

The operation of the device will now be described with the trip member 55 moved or turned out of engagement with the balancing lever 53, whereby the mechanism is adapted to operate to automatically regulate the draft, either by increasing or decreasing the same with the fluctuation of boiler pressure. It is used in this manner only when it is more important to secure sufficient heat than a strict economy in fuel consumption as is the case in severe weather.

It will be noted that the damper door 12 is heavier than the draft door 11, if therefore the damper door 12 is closed and the draft door 11 is fully opened, and the chain 41 taut, then the quadrant 49 will be in its full counter-clockwise position and the pawl 52 will be in engagement with the extreme notch or tooth adjacent the position of the regulator designated as cold or zero. Upon the maximum desired pressure having been reached, the transmitting lever 20 will be rotated in a clockwise direction by a slight upward movement of the piston rod 19 resulting from the increase in boiler pressure above the maximum desired. This clockwise movement of the lever 20 will cause a corresponding movement of the quadrant 49 since it is connected to the lever by means of the pawl 52, causing a movement of the draft door 11 towards closing position, and a movement of the damper door 12 towards open position. This of course, will cause a checking of the fire as it should be under the circumstances, namely rising pressure beyond the predetermined amount. It is therefore obvious that by changing the position of the quadrant relative to the pawl 52 that the amount of the opening of the draft door 11 is varied with a consequent change in time of the beginning of the movement of the transmitting lever to cause a movement of the damper door toward opening position and a corresponding movement of the draft door towards closing position. Thus, if the quadrant is set in relation to the pawl 52 so that the latter will be in engagement with a notch or tooth adjacent the position of the regulator designated as mild, the damper door will be, of course partially opened, and the draft door will be in a position intermediate its full open position and its closed position. Upon an increase in pressure above the desired predetermined pressure the lever 20 will be rotated in a clockwise direction by the upward movement of the piston rod 19 resulting from an increase in boiler pressure. This clockwise rotation of the transmitting lever will cause a corresponding movement of the regulator which will instantly start a closing of the draft door 11 and a further opening of the damper door 12 with the result that the fire is checked as it should be under the circumstances, namely, rising pressure beyond the predetermined amount. Upon a drop in pressure below the predetermined amount, the piston rod 19 will drop, causing a counter-clockwise rotation of the lever 20, which will permit the heavier damper door 12 to move the quadrant in a counter-clockwise direction in unison with the lever 20, thus permitting moving of the damper door towards closing position and a corresponding movement of the draft door towards a wider open position.

From the above it will be seen that a regulator has been provided which is simple, positive in action and readily adjustable to any desired range within which it is desired to regulate a boiler or other heat generating system.

The device, as has been hereinbefore explained is also capable of causing an automatic gradual closing of the draft door and a corresponding gradual opening of the damper door. This is especially useful after a new supply of coal has been fed to the fire, the draft door is fully opened to cause a quick burning of the fuel, and as soon as the fuel has a good start, the draft door closes thereby checking the fire. This reduces the pressure in the cylinder and the piston returns to its lower position thus reopening the draft. However, due to the actuation of the levers and pawls on the regulator, the draft door is opened to a lesser degree than that which it previously occupied. As the pressure rises again the draft is closed and the cycle is repeated, the draft door opening less each time, thereby automatically and gradually reducing the draft, to effect an economy in fuel consumption.

The operation of the device for this gradual regulation is as follows. The trip member 55 is pulled outwardly against the compression of the spring 58 and revolved till the rib 56 slips into engagement with the slot 57, in which position, the member 55 will be in contacting engagement with the balancing lever 53. After a fresh supply of coal has been fed to the fire, the regulator 49 will be moved to its extreme counter-clockwise position, the pawls 52 and 54 engaging the extreme right ratchet teeth adjacent the portion of the quadrant marked cold or zero, at which position the draft door 11 will be wide open, the damper door 12 will be closed, and the chain 41 will be substantially taut. Upon an increase in pressure in the boiler, the piston 18 will move upward causing a rotation in a clockwise direction of the lever 20, and a somewhat greater rotation of the balancing lever 53 about its pivot, since the lever 53 will not only move with the lever 20, but it will rotate about its own pivot because of its engagement with the trip member 55. The pawl 54 carried by the balancing lever 53 will, therefore, cause the quadrant to advance more rapidly than the transmitting lever 20, thus causing the pawl 52 to drop into a tooth to the rear of the one in which it has previously rested. The clockwise movement of the quadrant will, of course, close the draft and check the fire and in so doing the pressure in the boiler will lower. The lowering of the pressure will then permit the piston to return to its normal position, carrying the lever arm 20 downward. Upon the return movement the balancing lever will also return and because of the trip member 55 the pawl 54, carried on the balancing lever, will travel a greater distance than the pawl 52 and it will engage in a notch to the rear of that which it previously occupied. During this counter clockwise movement of the lever the weight of the check door 12 will also cause the quadrant to move counterclockwise, its motion in this direction being limited by the pawl 52 which is now in engagement with a tooth to the rear of the one which it previously engaged. This will open the draft door and as the pressure in the boiler increases, the levers and quadrant will again rotate clockwise. Thus, after the first clockwise advance of the quadrant and its subsequent movement in a counter-clockwise direction both pawls will be in engagement with the quadrant, preferably one notch to the rear of its original starting position, and the damper door 11 will be opened a lesser amount and the draft 12 closed a corresponding amount. This will take place with each successive fluctuation of the pressure piston 18 and thereby cause a step by step clockwise advance of the quadrant until the quadrant has been moved, relative to the lever 20, to its extreme clockwise position at which time the draft door 11 will be fully closed and the damper door 12 fully opened.

The setting of the device in its counter-clockwise or starting position is usually made at the time the furnace is supplied with fuel and by the time or before the quadrant has reached its extreme clockwise position, relative to the lever 20, it is time to resupply fuel, at which time the pawls are again set at cold or zero and the quadrant moved to its extreme counter-clockwise position, and the cycle repeats itself.

The objects of the invention are accomplished in a very simple manner by the construction and arrangement of parts shown and described but it is considered that the same is capable of many alternatives without departing from the spirit of the invention as defined in the appended claims.

I claim:

1. In a device of the class described, the combination with a fire draft closure and a flue damper closure, of pressure operated means, a pivotally mounted regulator having ratchet teeth, a pivotally mounted transmitting lever operatively connecting said pressure operated means and said regulating means, flexible means connecting the closures with the regulator arranged so that one of said closures closes as the other opens upon rotation of said regulator, a balancing lever pivotally mounted on the transmitting means, trip means in the path of the balancing lever, two pawls, one mounted on the transmitting lever and the other on the balancing lever, both engaging said ratchet teeth whereby upon fluctuation of the pressure applied to the pressure operated means a step by step advance movement is imparted to the regulator by the pawls upon the transmitting lever carrying the balancing lever into engagement with said trip means.

2. In a device of the class described, the combination with a fire draft closure and a flue damper closure, of pressure operated means, a pivotally mounted regulator having ratchet teeth on its internal periphery, a pivotally mounted transmitting lever responsive to pressure changes, connecting said pressure operated means and said regulating means, chains connecting the closures with the regulators so that one of said closures opens as the other closes upon rotation of said regulator, a balancing lever pivotally mounted on said transmitting lever, a stationary trip cam mounted in the path of the balancing lever, two pawls of different length lever arms, the shorter pawl being mounted on the transmitting lever and the longer pawl being mounted on the balancing lever, both engaging said ratchet teeth whereby upon a fluctuation of the pressure applied to the pressure operated means a step by step advance movement is imparted to the regulator upon the transmitting lever carrying the balancing lever into engagement with said trip means to operate the pawls.

3. A device of the class described adapted to alternately open and close a fire draft closure and a flue damper comprising, in combination, a cylinder connected with a source of pressure, a piston mounted for reciprocation in said cylinder having a piston rod extending beyond the end of said cylinder, a toothed regulator having end apertures, one adapted to be connected with each closure, pivotally mounted adjacent said cylinder, pivotally mounted transmitting means operatively connected to said piston rod arranged to rotate responsive to pressure changes in said cylinder, a balancing lever pivotally mounted on said transmitting means, a pair of pawls, one mounted on said transmitting means and the other on the balancing lever, both engaging the regular teeth, trip means engaging the balancing lever whereby upon a rocking back and forth of the transmitting lever a step by step advance movement of the regulator is effected by the contacting of the balancing means with the trip means, produced by the cooperation of the pawls with the teeth of the regulator.

4. A device of the class described adapted to alternately open and close a fire draft closure and a flue damper comprising, in combination, a cylinder connected with a source of pressure, a piston mounted for reciprocation therein, a piston rod extending from said piston through an elongated boss on one of the cylinder heads, a slotted connection on the end of said piston rod, a plate adapted to carry a standard secured to said boss, a standard having a forked end secured to said plate, a toothed regulator pivotally mounted to said fork and provided with end apertures, one adapted to be connected with each closure, transmitting means having a common pivot center with said regulator and operatively connected to said slotted connection arranged to rotate responsive to pressure changes in said cylinder, a balancing lever pivotally mounted on said transmitting means to operate one of a pair of pawls, one of which is mounted on said transmitting means and the other on the balancing lever, both of said pawls engaging the regulator teeth and arranged to impart a gradual step by step advance movement of the regulator, trip means engaging the balancing lever, whereby upon a rocking back and forth of the transmitting lever the gradual advance movement of the regulator is effected by the contacting of the balancing means with the trip means to operate said pawls.

5. A device of the class described adapted to alternately open and close a fire draft closure and a flue damper closure comprising, in combination, a cylinder connected with a source of pressure, a piston mounted for reciprocation therein, a piston rod extending from said piston through one of the cylinder heads, a tooth regulator mounted adjacent said piston rod, means for connecting said regulator with the closures, transmitting means operatively associated with the regulator and operatively connected with said piston to rock responsive to pressure changes in said cylinder, a balancing lever pivotally mounted on said transmitting means to operate one of a pair of pawls, one of which is mounted on said transmitting means and the other on the balancing lever, both of said pawls engaging the regulator teeth and arranged to impart a gradual step by step advance movement of the regulator, trip means engaging the balancing lever, whereby upon a rocking back and forth of the transmitting lever the gradual advance movement of the regulator is effected by the contacting of the balancing means with the trip means to operate said pawls.

6. A device of the class described adapted to alternately open and close a fire draft closure and a flue damper closure comprising, in combination, pressure responsive means connected with a source of pressure, a toothed regulator mounted adjacent said pressure means, means for connecting said regulator with the closures, transmitting means operatively associated with the regulator and pressure responsive means to rock responsive to pressure changes of said pressure responsive means, a balancing lever pivotally mounted on said transmitting means to operate one of a pair of pawls, one of which is mounted on said transmitting means and the other on the balancing lever, both of said pawls engaging the regulator teeth and arranged to impart a gradual step by step advance movement of the regulator, trip means engaging the balancing lever whereby upon a rocking back and forth of the transmitting lever the gradual advance movement of the regulator is effected by the contacting of the balancing means with the trip means to operate said pawls.

7. A device of the class described adapted to alternately open and close a fire draft closure and a flue damper closure comprising, in combination, pressure responsive means connected with a source of pressure, a toothed regulator mounted adjacent said pressure means, means for connecting said regulator with the closures, transmitting means operatively associated with the regulator and pressure responsive means to rock responsive to pressure changes of said pressure responsive means, means associated with the transmitting means to operate one of a pair of pawls, one of which is mounted on said transmitting means and the other on the balancing lever, both of said pawls engaging the regulator teeth and arranged to impart a gradual step by step advance movement of the regulator, trip means engaging the balancing lever, whereby upon a rocking back and forth of the transmitting lever the gradual advance movement of the regulator is effected by the contacting of the balancing means with the trip means to operate said pawls.

In testimony whereof I affix my signature at 10 South La Salle St., Chicago, Illinois.

BARNEY GOODMAN.